US012679995B1

(12) United States Patent
Albalawi et al.

(10) Patent No.: US 12,679,995 B1
(45) Date of Patent: Jul. 14, 2026

(54) FLUORINATED, NANO GO-REINFORCED DUAL-CURED ALKYD-POLYESTER

(71) Applicant: UNIVERSITY OF TABUK, Tabuk (SA)

(72) Inventors: Mona Obead Albalawi, Tabuk (SA); Moatassim Mohamed Raoof Mohamed Rashad Shindy, Alexandria (EG); Magdy Youssef Ali Abdelaal, Mansoura (EG); Mohamed Abdel Salam, Tallahassee, FL (US)

(73) Assignee: UNIVERSITY OF TABUK, Tabuk (SA)

( * ) Notice: Subject to any disclaimer, the term of this patent is extended or adjusted under 35 U.S.C. 154(b) by 0 days.

(21) Appl. No.: 19/420,588

(22) Filed: Dec. 15, 2025

(30) Foreign Application Priority Data

Nov. 11, 2025    (SA)   ................................. 1020258363

(51) Int. Cl.
| | |
|---|---|
| *C09D 167/03* | (2006.01) |
| *C08K 3/04* | (2006.01) |
| *C08K 5/098* | (2006.01) |
| *C08K 5/29* | (2006.01) |
| *C09D 7/20* | (2018.01) |
| *C09D 7/61* | (2018.01) |
| *C09D 7/63* | (2018.01) |

(52) U.S. Cl.
CPC ............ *C09D 167/03* (2013.01); *C08K 3/042* (2017.05); *C08K 5/098* (2013.01); *C08K 5/29* (2013.01); *C09D 7/20* (2018.01); *C09D 7/61* (2018.01); *C09D 7/63* (2018.01)

(58) Field of Classification Search
CPC ...................................................... C08K 3/042
See application file for complete search history.

(56) References Cited

U.S. PATENT DOCUMENTS

| | | | |
|---|---|---|---|
| 2,897,733 A | 8/1959 | Shuger | |
| 6,726,960 B1 * | 4/2004 | Sanduja | B05D 7/14 |
| | | | 428/447 |

FOREIGN PATENT DOCUMENTS

| | | |
|---|---|---|
| CN | 103409047 A | 11/2013 |
| CN | 115386277 A | 11/2022 |
| CN | 116102960 A | 5/2023 |
| EP | 2 253 678 A1 | 11/2010 |
| JP | 2002-249529 A | 9/2002 |

OTHER PUBLICATIONS

Krishnamoorthy et al., "Graphene Oxide Nanopaint," 2014, Carbon 72, pp. 328-337. (Year: 2014).*
Dong et al., "Preparation and properties of acrylic resin coating modified by functional graphene oxide", 2016, Appl. Surf. Sci. 368, pp. 378-387. (Year: 2016).*
Ad Hofland, "Alkyd resins: From down and out to alive and kicking", Progress in Organic Coatings, vol. 73, Issue 4, Mar. 1, 2011, pp. 274-282, Excerpts only, 7 pages.

* cited by examiner

*Primary Examiner* — Robert A Vetere
(74) *Attorney, Agent, or Firm* — Oblon, McClelland, Maier & Neustadt, L.L.P.

(57) ABSTRACT

An alkyd-polyester paint which includes a graphene oxide (GO)-modified resin, benzoyl peroxide, a diisocyanate, a pigment, a solvent, and one or more components such as a tertiary amine and a metal carboxylate. The GO-modified resin includes graphene oxide, 3,3'difluorodiallyl phthalate and tetrafluorophthalic anhydride.

20 Claims, 1 Drawing Sheet

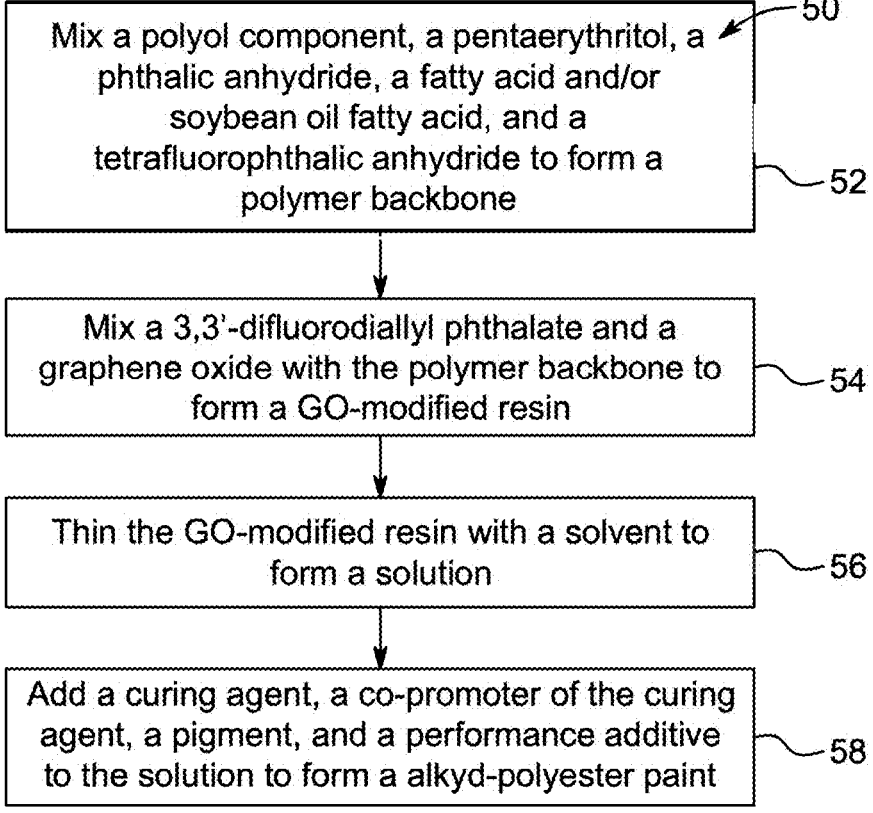

FLUORINATED, NANO GO-REINFORCED DUAL-CURED ALKYD-POLYESTER

BACKGROUND

Technical Field

The present disclosure is directed towards a synthesis of an alkyd-polyester paint, more particularly, a fluorinated, nano GO-reinforced dual-cured alkyd-polyester paint, an alkyd-polyester paint made by the synthesis, a method of using the alkyd-polyester paint and a cured paint derived from the alkyd-polyester paint.

Description of Related Art

The "background" description provided herein is for the purpose of generally presenting the context of the disclosure. The work of the presently named inventors, to the extent it is described in this background section, as well as aspects of the description which may not otherwise qualify as prior art at the time of filing, are neither expressly nor impliedly admitted as prior art against the present invention.

Sports field markings play a vital role in ensuring athlete safety, maintaining the fairness of gameplay, and preserving the operational integrity of sporting facilities. With the global demand for sports surfacing and marking paints steadily rising, there is an urgent need for solutions that can endure the unique and extreme conditions present in athletic environments conditions that are far more punishing than those encountered by conventional road coatings. Unlike roads that bear the distributed weight of vehicular traffic, sports fields are subjected to concentrated, repetitive foot traffic, cleated footwear impacts, sliding, and sharp directional changes, all of which cause localized mechanical abrasion that rapidly erodes painted lines and symbols. These surfaces also face continuous environmental stressors, including intense ultraviolet (UV) radiation that accelerates fading, binder degradation, and chalking. Thermal fluctuations cause expansion and contraction cycles that can induce cracking and delamination, while moisture from rainfall, irrigation, or sweat exacerbates paint breakdown. Additionally, routine exposure to chemicals-such as fertilizers, pesticides, and maintenance solutions-further includes coating integrity. Compounding the issue is the diversity of substrates used in sports facilities, from natural and synthetic turf to concrete and asphalt, each with distinct adhesion and flexibility requirements. The net result is frequent, costly re-marking operations that not only consume labor and materials but also disrupt field availability. Addressing these challenges with durable, low-maintenance, and cost-efficient marking solutions is therefore a pressing priority for global sports facility managers.

Traditional sports field paints consistently fall short in meeting the rigorous performance demands of athletic surfaces. Most commonly used paints are derivatives of general-purpose road markings or architectural coatings, which are inherently ill-suited for the unique combination of mechanical, chemical, and environmental stresses encountered on sports fields. Water-based acrylic and latex formulations, although environmentally favorable due to their low VOC content and ease of application, form relatively soft films that are prone to rapid wear and scuffing under high-impact, cleated traffic. Their resistance to moisture and a variety of field-related chemicals is limited, leading to issues such as poor adhesion, film degradation, and color loss over time. On the other hand, conventional solvent-borne alkyd paints offer improved initial hardness but are highly vulnerable to photodegradation and oxidation when exposed to prolonged sunlight, resulting in yellowing, chalking, and reduced visibility of markings—especially in regions with high UV exposure. Furthermore, their resistance to common field solvents, oils, and cleaning agents is inconsistent and often inadequate. These shortcomings make both water-based and alkyd systems unreliable for long-term performance in sports environments, thereby underscoring the need for more advanced, resilient paint technologies specifically tailored to athletic applications.

There is a clear and consistent shortfall in current technologies: previous solutions typically address only isolated aspects of the multifaceted challenges associated with sports field markings or are intended for entirely different applications with dissimilar performance demands. For example, some solutions focus on durable alkyd and polyester resins primarily tailored for road and traffic markings. While these formulations may claim general wear resistance suitable for vehicular use, they fundamentally overlook the unique and intense abrasion caused by cleated athletic footwear—a core need for sports field applications. Notably, they lack attention to important factors such as the optimal ratios of unsaturated or di-unsaturated aliphatic monomers that impart elasticity, the inclusion of reinforcing agents like graphene oxide, or the incorporation of advanced dual-cure systems designed to address the complex stressors present on sports fields. Even soluitons with sports-specific applications reveal deficiencies, such as being limited to temporary markings, inherently dismissing the need for permanent, long-term durability or failing to disclose essential structural features such as precise aliphatic monomer content or the specific resilience needed to endure repeated and localized foot impacts during athletic activity. Other work recognizes the advancements in resin chemistry but does not delve into targeted innovations for permanent sports field applications, nor does it consider modern enhancements such as graphene oxide reinforcement or synergistic dual-curing mechanisms. Collectively, conventional paints fall short of delivering a robust, unified solution that ensures high-performance foot traffic resistance, enduring UV and chemical stability, and adaptability across multiple surface types. The evident lack of disclosure regarding the ability to endure intense, repetitive athletic movement represents an unaddressed gap in the current state of the art. Accordingly, one object of the present disclosure is to provide a method of synthesizing an alkyd-polyester paint that may circumvent the above specified drawbacks and limitation of the materials and methods known in the art, and an alkyd-polyester paint made by the method.

SUMMARY

In an exemplary embodiment, an alkyd-polyester paint is described. The paint includes a graphene oxide (GO)-modified resin, benzoyl peroxide, a diisocyanate, a pigment, a solvent, and one or more selected from the group consisting of a tertiary amine and a metal carboxylate. The GO-modified resin includes graphene oxide, 3,3'difluorodiallyl phthalate and tetrafluorophthalic anhydride.

In some embodiments, the GO is 0.1-5 wt % of the total weight of the alkyd-polyester paint.

In some embodiments, the 3,3'difluorodiallyl phthalate is 3-10 wt % of the total weight of the alkyd-polyester paint.

In some embodiments, the tetrafluorophthalic anhydride is 3-10 wt % of the total weight of the alkyd-polyester paint.

In some embodiments, the diisocyanate is one or more selected from the group consisting of hexamethylene diisocyanate (HDI), isophorone diisocyanate (IPDI), and a HDI trimer/IPDI.

In some embodiments, the tertiary amine is one or more selected from the group consisting of N,N-dimethylaniline and N,N-dimethyl-p-toluidine.

In some embodiments, the metal carboxylate is cobalt octoate.

In some embodiments, the pigment is at least one selected from the group consisting of titanium dioxide, yellow iron oxide, red iron oxide, carbon black and black iron oxide.

In some embodiments, the pigment is 25-40 wt % of the total weight of the alkyd-polyester paint.

In some embodiments, the alkyd-polyester paint further includes one or more selected from the group consisting of a flow agent, an anti-settling agent, a foam control agent, a UV-absorber, and an odor masking additive.

In some embodiments, the solvent is one or more selected from the group consisting of ethyl acetate and xylene.

In some embodiments, the solvent is a mixture of ethyl acetate and xylene.

In some embodiments, the ethyl acetate is 30-70% of the total volume of the solvent and xylene is 30-70% of the total volume of the solvent.

In some embodiments, the solvent is 20-30 wt % of the total weight of the paint.

In another exemplary embodiment, a method of making the alkyd-polyester paint is described. The method includes mixing a polyol component, pentaerythritol, phthalic anhydride, and tetrafluorophthalic anhydride to form a polymer backbone. The method further includes mixing 3,3'-difluorodiallyl phthalate and graphene oxide with the polymer backbone to form the GO-modified resin, followed by thinning the GO-modified resin with a solvent to form a solution. The method further includes adding the curing agent, the co-promoter of the curing agent, the pigment, and the performance additive to the solution to form the alkyd-polyester paint.

In some embodiments, the mixing to form the polymer backbone is at 150-300° C.

In some embodiments, the adding to form a GO-modified resin is at 25-100° C.

In some embodiments, the alkyd-polyester paint has a color change (ΔE) of 0-2.0 after 5,000 hours of UV irradiation.

In some embodiments, the alkyd-polyester paint has 0-10% thermal degradation up to 80° C.

In some embodiments, the alkyd-polyester paint has volatile organic compound content of less than 100 g L$^{-1}$.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein:

The FIGURE is a schematic diagram of an exemplary flow chart of a method of making the alkyd-polyester paint, according to certain embodiments.

DETAILED DESCRIPTION

When describing the present disclosure, the terms used are to be construed in accordance with the following definitions, unless a context dictates otherwise.

Embodiments of the present invention will now be described more fully hereinafter with reference to the accompanying drawings wherever applicable, in that some, but not all, embodiments of the disclosure are shown.

In the drawings, like reference numerals designate identical or corresponding parts throughout the several views. Further, as used herein, the words 'a,' 'an' and the like generally carry a meaning of 'one or more,' unless stated otherwise.

Furthermore, the terms 'approximately,' 'approximate,' 'about,' and similar terms generally refer to ranges that include the identified value within a margin of 20%, 10%, or preferably 5%, and any values therebetween.

As used herein, the term 'room temperature' refers to a temperature range of '25 degrees Celsius (° C.)±3° C. in the present disclosure.

As used herein, the term 'alkyd-polyester paint' refers to a composite paint formulation including a blend of alkyd and polyester resins, designed to combine the flexibility, adhesion, and drying properties of alkyds with the chemical and weather resistance of polyesters, particularly suitable for high-performance applications like aircraft runway markings.

As used herein, the term 'alkyd resin' refers to a synthetic resin obtained by the polycondensation of polyols, dibasic acids or anhydrides, and fatty acids or oils, commonly used in coatings due to its excellent film-forming, flexibility, and gloss retention characteristics. The alkyd resin may include, but are not limited to, fatty acid chains, including polyester urethanes and polyester amides, polyols such as glycerol, or polyester modified with of oils and/or fatty acids.

The alkyd resin may include, but are not limited to, fatty acid chains, including polyester urethanes and polyester amides, polyols such as glycerol, or polyester modified with of oils and/or fatty acids. In a preferred embodiment, the alkyd resin is the reaction product of a polyol (e.g., ethylene glycol, diethylene glycol), pentaerythritol, phthalic anhydride, and fatty acids derived from soybean oil, linseed oil, or tung oil.

As used herein, the term 'polyester resin' refers to a synthetic polymer formed by the reaction of polyhydric alcohols with polybasic acids or anhydrides, known for its strong mechanical properties, chemical resistance, and durability in harsh environments. Usable examples thereof include polyethylene terephthalate, polypropylene terephthalate, polybutylene terephthalate, polyethylene-2,6-naphthalate, poly-1,4-cyclohexanedimethylene terephthalate, and 1,4-cyclohexanedimethanol copolymerized polyethylene terephthalate. Further, these resins may be a homo-resin, a copolymer, or a blend.

Usable examples thereof include polyethylene terephthalate, polypropylene terephthalate, polybutylene terephthalate, polyethylene-2,6-naphthalate, poly-1,4-cyclohexanedimethylene terephthalate, and 1,4-cyclohexanedimethanol copolymerized polyethylene terephthalate. Further, these resins may be a homo-resin, a copolymer, or a blend. In the present disclosure, the polyester component is formed by the polycondensation of a polyol, pentaerythritol, phthalic anhydride, and tetrafluorophthalic anhydride, resulting in a fluorinated alkyd-polyester hybrid resin.

As used herein, the term 'epoxy resin' refers to a thermosetting polymer containing reactive epoxide groups that, when cured with appropriate hardeners, forms a rigid, chemically resistant network widely used in coatings, adhesives, and composites.

A weight percent of a component, unless specifically stated to the contrary, is based on the total weight of the formulation or composition in which the component is included. For example, if a particular element or component in a composition or article is said to have 5 wt. %, it is understood that this percentage is in relation to a total compositional percentage of 100%.

The present disclosure is intended to include all hydration states of a given compound or formula, unless otherwise noted or when heating a material.

In addition, the present disclosure is intended to include all isotopes of atoms occurring in the present compounds and complexes. Isotopes include those atoms having the same atomic number but different mass numbers.

An aspect of the present disclosure is directed to an alkyd-polyester paint, more particularly, a fluorinated, nano GO-reinforced dual-cured alkyd-polyester paint.

An alkyd-polyester paint is described. The alkyd-polyester paint includes graphene oxide (GO)-modified resin, benzoyl peroxide, a diisocyanate, a pigment, a solvent, and one or more selected from the group consisting of a tertiary amine and a metal carboxylate.

In some embodiments, the GO-modified resins may include, but are not limited to, epoxy resin, novolac resin, bisphenol-A based resin, bisphenol-F epoxy, phenolic resin, vinyl ester, unsaturated polyester, polyimide, polybenzo-xazine, cyanate ester, urethane-modified epoxy, silicone-modified epoxy, melamine-formaldehyde resin, urea-form-aldehyde resin, alkyd resin, furan resin, acrylic resin, maleimide resin, bismaleimide resin, and benzoxazine resin. In a preferred embodiment, the GO-modified resin includes graphene oxide, 3,3'difluorodiallyl phthalate and tetrafluo-rophthalic anhydride. The resin is modified by the formation of covalent bonds between the hydroxyl and carboxyl groups inherently present on the GO surface and carboxyl or hydroxyl functionalities on the resin backbone.

In some embodiments, the GO may range from 0.1-5 wt %, preferably 0.5-5 wt %, preferably 1.0-5 wt %, preferably 1.5-5 wt %, preferably 2.0-5 wt %, preferably 2.5-5 wt %, preferably 3.0-5 wt %, preferably 3.5-5 wt %, preferably 4.0-5 wt %, preferably 4.5-5 wt % of the total weight of the alkyd-polyester paint. In a preferred embodiment, the GO is 1.5 wt % of the total weight of the alkyd-polyester paint. In some embodiments, the 3,3'difluorodiallyl phthalate may range from 10-20 wt %, preferably 12-20 wt %, preferably 12-20 wt %, preferably 12-20 wt %, preferably 12-20 wt % of the total weight of the alkyd-polyester paint. In a pre-ferred embodiment, the 3,3'difluorodiallyl phthalate is 15 wt % of the total weight of the alkyd-polyester paint. In some embodiments, the tetrafluorophthalic anhydride may range from 10-20 wt %, preferably 12-20 wt %, preferably 12-20 wt %, preferably 12-20 wt %, preferably 12-20 wt % of the total weight of the alkyd-polyester paint. In a preferred embodiment, the tetrafluorophthalic anhydride is 15 wt % of the total weight of the alkyd-polyester paint.

In some embodiments, the diisocyanate may include, but is not limited to, toluene diisocyanate (TDI), methylene diphenyl diisocyanate (MDI), hydrogenated MDI (H12MDI), naphthalene diisocyanate (NDI), dicyclohexyl-methane diisocyanate, phenylene diisocyanate, xylylene dii-socyanate (XDI), dimer acid-based diisocyanate, lysine dii-socyanate (LDI), 1,5-naphthylene diisocyanate, 1,4-cyclohexane diisocyanate, bitolylene diisocyanate, m-tetramethylxylene diisocyanate (TMXDI), trimethylhexamethylene diisocyanate, 2,4-toluene diisocyanate, 2,6-tolu-ene diisocyanate, 4,4'-diphenylmethane diisocyanate, 3,3'-dimethyl-4,4'-biphenylene diisocyanate, norbornene diisocyanate, and acenaphthylene diisocyanate. In a pre-ferred embodiment, the diisocyanate is one or more selected from the group consisting of hexamethylene diisocyanate (HDI), isophorone diisocyanate (IPDI), and a HDI trimer/IPDI.

In some embodiments, the tertiary amine may include, but is not limited to, triethylamine, trimethylamine, tripropylam-ine, tributylamine, N-methyldiethanolamine, N-ethylmor-pholine, N-methylmorpholine, triethanolamine, N,N-dim-ethylcyclohexylamine, N,N-diethylethanolamine, N,N-dimethylbenzylamine, N,N-diisopropylethylamine, N-methylpiperidine, 1,4-diazabicyclo[2.2.2]octane (DABCO), 1,8-diazabicyclo[5.4.0]undec-7-ene (DBU), N,N,N',N'-tetramethylethylenediamine (TMEDA), quinucli-dine, N,N-dicyclohexylmethylamine, and triisopropa-nolamine. In a preferred embodiment, the tertiary amine is one or more selected from the group consisting of N,N-dimethylaniline and N,N-dimethyl-p-toluidine.

In some embodiments, the metal carboxylate may include, but is not limited to, manganese octoate, zirconium octoate, calcium octoate, zinc octoate, iron octoate, copper octoate, lead naphthenate, manganese naphthenate, zinc naphthen-ate, calcium naphthenate, iron naphthenate, barium neode-canoate, zirconium neodecanoate, zinc neodecanoate, tin octoate, aluminum octoate, cerium octoate, nickel naphth-enate, bismuth neodecanoate, and vanadium octoate. In a preferred embodiment, the metal carboxylate is cobalt octoate.

In some embodiments, the pigment may include, but is not limited to, phthalocyanine blue, phthalocyanine green, ultramarine blue, chromium oxide green, chrome yellow, cadmium red, cadmium yellow, molybdate orange, anti-mony white, zinc white, lithopone, barium sulfate, strontium chromate, zinc chromate, manganese violet, cobalt violet, cobalt blue, cobalt green, ferric ammonium ferrocyanide (Prussian blue), and diarylide yellow. In a preferred embodi-ment, the pigment is at least one selected from the group consisting of titanium dioxide, yellow iron oxide, red iron oxide, carbon black and black iron oxide. In some embodi-ments, the pigment may range from 25-40 wt %, preferably 27-40 wt %, preferably 29-40 wt %, preferably 31-40 wt %, preferably 33-40 wt %, preferably 35-40 wt %, preferably 37-40 wt %, preferably 39-40 wt % of the total weight of the alkyd-polyester paint.

In some embodiments, the solvent may include, but is not limited to, methyl ethyl ketone (MEK), methyl isobutyl ketone (MIBK), acetone, toluene, butyl acetate, isopropanol, ethanol, n-butanol, sec-butanol, tert-butanol, methanol, cyclohexanone, diacetone alcohol, dimethylformamide (DMF), dimethyl sulfoxide (DMSO), tetrahydrofuran (THF), ethylene glycol, propylene glycol, dipropylene gly-col monomethyl ether, ethylene glycol monobutyl ether, butyl cellosolve, propylene glycol monomethyl ether acetate (PGMEA), N-methyl-2-pyrrolidone (NMP), dioxane, ben-zyl alcohol, hexane, heptane, decane, isophorone, and tur-pentine. In a preferred embodiment, the solvent is one or more selected from the group consisting of ethyl acetate and xylene. In the present disclosure, the solvent is a mixture of ethyl acetate and xylene.

In some embodiments, ethyl acetate may range from 30-70%, preferably 35-70%, preferably 40-70%, preferably 45-70%, preferably 50-70%, preferably 55-70%, preferably 60-70%, preferably 65-70% of the total volume of the solvent and xylene may range from 30-70%, preferably 35-70%, preferably 40-70%, preferably 45-70%, preferably 50-70%, preferably 55-70%, preferably 60-70%, preferably 65-70% of the total volume of the solvent.

In some embodiments, the solvent may range from 20-30 wt %, preferably 21-30 wt %, preferably 22-30 wt %, preferably 23-30 wt %, preferably 24-30 wt %, preferably 25-30 wt %, preferably 26-30 wt %, preferably 27-30 wt %, preferably 28-30 wt %, preferably 29-30 wt % of the total weight of the paint.

The alkyd-polyester paint further includes one or more selected from the group consisting of a flow agent, an anti-settling agent, a foam control agent, a UV-absorber, and an odor masking additive. The flow agent ensures smooth film formation by eliminating surface defects such as brush or roller marks. The anti-settling agent maintains pigment and filler suspension, preventing sedimentation during storage. Foam control agents eliminate air bubbles introduced during mixing or application, ensuring a uniform, defect-free finish. UV absorbers enhance resistance to photodegradation and maintain color stability under sunlight exposure. Odor masking additives improve user comfort by minimizing unpleasant solvent or resin odors during and after application.

The alkyd-polyester paint further includes one or more performance additives selected from the group consisting of a flow agent, an anti-settling agent, a foam control agent, a UV-absorber, a hindered amine light stabilizer (HALS), and an odor masking additive.

Flow/Leveling Agents (typically added at 0.1-0.3 pbw) ensure smooth film formation by eliminating surface defects and include polymers such as polyacrylates, silicones (e.g., polydimethylsiloxane), or fluorosurfactants.

Anti-Settling Agents (typically added at 0.1-0.3 pbw) maintain pigment and filler suspension, preventing sedimentation during storage, and include organoclays (e.g., bentonite, hectorite), fumed silica, or polyamide waxes.

Foam Control Agents/Defoamers (typically added at 0.1-0.3 pbw) eliminate air bubbles introduced during mixing or application and include silicone-based emulsions, mineral oil blends, or hydrophobic silica.

UV Absorbers and Hindered Amine Light Stabilizers (HALS) (typically added at 0.05-0.15 pbw total) enhance resistance to photodegradation and maintain color stability. UV absorbers include benzotriazoles (e.g., Tinuvin 328) or benzophenones. HALS include derivatives of 2,2,6,6-tetramethylpiperidine (e.g., Tinuvin 292).

Odor Masking Additives (typically added at 0.05-0.15 pbw) improve user comfort by minimizing unpleasant solvent or resin odors and include essential oil blends (e.g., citrus, lavender) or synthetic fragrance agents.

The figure illustrates a schematic flow chart of a method 50 of making the alkyd-polyester paint. The order in which the method 50 is described is not intended to be construed as a limitation, and any number of the described method steps can be combined to implement the method 50. Additionally, individual steps may be removed or skipped from the method 50 without departing from the spirit and scope of the present disclosure.

At step 52, the method 50 includes mixing a polyol component, pentaerythritol, phthalic anhydride, and tetrafluorophthalic anhydride to form a polymer backbone. In some embodiments, the mixing to form the polymer backbone may range from 150-300° C., preferably 170-300° C., preferably 190-300° C., preferably 210-300° C., preferably 230-300° C., preferably 250-300° C., preferably 270-300° C., preferably 290-300° C. In a preferred embodiment, the mixing to form the polymer backbone is at 180-240° C.

In some embodiments, the polyol component may include, but is not limited to, ethylene glycol, diethylene glycol, triethylene glycol, propylene glycol, dipropylene glycol, neopentyl glycol, 1,4-butanediol, 1,6-hexanediol, trimethylolpropane, pentaerythritol, glycerol, sorbitol, mannitol, xylitol, polyethylene glycol (PEG), polypropylene glycol (PPG), 2-butyl-2-ethyl-1,3-propanediol, cyclohexanedimethanol, tris(hydroxyethyl) isocyanurate, and ethoxylated bisphenol A.

In some embodiments, tetrafluorophthalic anhydride may include, but is not limited to, 3,4,5,6-tetrafluorophthalic anhydride, 2,3,5,6-tetrafluorophthalic anhydride, tetrafluorophthalic acid, tetrafluorophthalic imide, tetrafluorobenzene-1,2,4,5-tetracarboxylic anhydride, fluorinated trimellitic anhydride, perfluorophthalic anhydride, tetrafluorosuccinic anhydride, 2,3,5,6-tetrafluoromaleic anhydride, tetrafluorobenzene dicarboxylic anhydride, 2,3,4,5-tetrafluorocyclohexane-1,2-dicarboxylic anhydride, tetrafluoropyromellitic dianhydride, tetrafluorophthalic diacid chloride, tetrafluorophthalic diacid ester, tetrafluorophthalonitrile-derived anhydride, 2,3,5,6-tetrafluoroterephthalic anhydride, tetrafluoroisophthalic anhydride, fluorinated phthaloyl chloride, and perfluoroalkylated phthalic anhydride.

In some embodiments, phthalic anhydride may include, but is not limited to, isophthalic anhydride, terephthalic anhydride, hexahydrophthalic anhydride, methylphthalic anhydride, dimethylphthalic anhydride, trimellitic anhydride, pyromellitic dianhydride, 4-chlorophthalic anhydride, 4-nitrophthalic anhydride, bromophthalic anhydride, tetrachlorophthalic anhydride, tetrabromophthalic anhydride, phenylphthalic anhydride, cyclohexanedicarboxylic anhydride, benzophenonetetracarboxylic dianhydride, maleic anhydride, succinic anhydride, itaconic anhydride, and nadic anhydride.

In some embodiments, pentaerythritol may include, but is not limited to, dipentaerythritol, tripentaerythritol, monopentaerythritol, pentaerythritol ethoxylate, pentaerythritol propoxylate, pentaerythritol tetrabenzoate, pentaerythritol tetraoleate, pentaerythritol tetraisostearate, pentaerythritol ester of tall oil fatty acid, pentaerythritol tetrastearate, pentaerythritol tetraacrylate, pentaerythritol tetrakis(3-mercaptopropionate), pentaerythritol tetraformate, pentaerythritol tetrachloride, pentaerythritol diacrylate, pentaerythritol triacrylate, pentaerythritol tetramethacrylate, pentaerythritol tetrathioglycolate, and pentaerythritol tetraacetate.

At step 54, the method 50 includes mixing 3,3'-difluorodiallyl phthalate and graphene oxide with the polymer backbone to form the GO-modified resin. In some embodiments, the adding to form a GO-modified resin is at 25-100° C., preferably 30-100° C., preferably 35-100° C., preferably 40-100° C., preferably 45-100° C., preferably 50-100° C., preferably 55-100° C., preferably 60-100° C., preferably 65-100° C., preferably 70-100° C., preferably 75-100° C., preferably 80-100° C., preferably 85-100° C., preferably 90-100° C., preferably 95-100° C.

At step 56, the method 50 includes thinning the GO-modified resin with a solvent to form a solution. In some embodiments, the solvent may include, but is not limited to, methyl ethyl ketone (MEK), methyl isobutyl ketone (MIBK), acetone, toluene, butyl acetate, isopropanol, ethanol, n-butanol, sec-butanol, tert-butanol, methanol, cyclohexanone, diacetone alcohol, dimethylformamide (DMF), dimethyl sulfoxide (DMSO), tetrahydrofuran (THF), ethylene glycol, propylene glycol, dipropylene glycol monomethyl ether, ethylene glycol monobutyl ether, butyl cellosolve, propylene glycol monomethyl ether acetate (PGMEA), N-methyl-2-pyrrolidone (NMP), dioxane, benzyl alcohol, hexane, heptane, decane, isophorone, and turpentine. In a preferred embodiment, the solvent is one or more selected from the group consisting of ethyl acetate and xylene. In the present disclosure, the solvent is a mixture of ethyl acetate and xylene.

At step 58, the method 50 includes adding the curing agent, the co-promoter of the curing agent, the pigment, and the performance additive to the solution to form the alkyd-polyester paint.

In some embodiments, the alkyd-polyester paint has a color change (ΔE) may range from 0-2.0, preferably 0.2-2.0, preferably 0.4-2.0, preferably 0.6-2.0, preferably 0.8-2.0, preferably 1.0-2.0, preferably 1.2-2.0, preferably 1.4-2.0, preferably 1.6-2.0, preferably 1.8-2.0 after 5,000 hours of UV irradiation. In a preferred embodiment, the alkyd-polyester paint has a color change (ΔE) of less than 1.0 after 5,000 hours of UV irradiation.

In some embodiments, the alkyd-polyester paint has 0-10%, preferably 1-10%, preferably 2-10%, preferably 3-10%, preferably 4-10%, preferably 5-10%, preferably 6-10%, preferably 7-10%, preferably 8-10%, preferably 9-10% thermal degradation up to 80° C. In a preferred embodiment, the alkyd-polyester paint has volatile organic compound content of less than 100 g $L^{-1}$.

The following examples are provided solely for illustration and are not to be construed as limitations of the present disclosure, as many variations thereof are possible without departing from the spirit and scope of the present disclosure.

EXAMPLES

The following examples demonstrate a method for preparation of an alkyd-polyester paint. The present invention provides a high-performance, dual-cure, nano GO-reinforced fluorinated alkyd-polyester paint composition engineered to overcome the deficiencies of conventional sports field markings. This formulation delivers enhanced durability and visibility, and comprehensive versatility, ensuring long-lasting, robust markings that improve playing safety and reduce maintenance requirements for athletic venues. The examples are provided solely for illustration and are not to be construed as limitations of the present disclosure, as many variations thereof are possible without departing from the spirit and scope of the present disclosure.

Example 1: Compositional Elements and their Roles

The sports field marking paint composition is engineered from a blend of components, each contributing to the overall performance characteristics and addressing limitations of the prior art. The key compositional elements and their respective functions are detailed as follows:
Graphene Oxide-Modified Alkyd-Polyester Resin System
Graphene Oxide-Modified Alkyd-Polyester Resin System constitutes the primary binder system, forming the backbone of the cured film and providing the foundational properties of adhesion, flexibility, and initial hardness.
Alkyd-Polyester Resin Base
The resin serves as the foundational polymeric matrix, providing the bulk film-forming properties, adhesion to diverse substrates, and the necessary hydroxyl functionality for reaction with the isocyanate curing agents. Its inherent alkyd nature contributes to good wetting and flow characteristics during application.
Graphene Oxide (GO)
GO is incorporated at a precisely controlled concentration, typically ranging broadly from 0.1 to 5% by weight of the resin solids, preferably 0.5 to 2%. The GO is covalently bonded into the alkyd-polyester matrix during resin synthesis. The hydroxyl and carboxyl groups inherently present on the GO surface react with carboxyl or hydroxyl functionalities on alkyd-polyester resin backbone. The two-dimensional, high aspect ratio structure of GO, coupled with its excellent mechanical properties, confers nano-reinforcement. This directly enhances the abrasion resistance, mechanical strength, and overall toughness of the cured film, thereby mitigating the rapid wear and erosion caused by intense foot traffic.
Fluorinated Monomers
The monomers are integrated into the alkyd-polyester backbone, imparting chemical and environmental resistance. 3,3'-Difluorodiallyl Phthalate. a di-functional fluorinated monomer, is incorporated into the resin structure, typically ranging broadly from 10 to 20% by weight of the resin solids, preferably 12 to 18%. Its allyl functionalities provide sites for free radical polymerization, initiated by benzoyl peroxide, enabling high crosslink density. The fluorine atoms directly contribute to creating a robust fluorinated polymer network, which confers chemical inertness, making the paint resistant to a broad spectrum of aggressive chemicals, oils, and solvents that degrade conventional markings. This directly addresses the problem of chemical breakdown common in sports field environments.
Tetrafluorophthalic Anhydride
Tetrafluorophthalic Anhydride is incorporated into the polyester synthesis, typically ranging broadly from 10 to 20% by weight of the resin solids, preferably 12 to 18%. This component further enhances the overall fluorine content within the polymer backbone. Its presence improves the UV resistance of the cured film by reducing the susceptibility to photo-oxidative degradation, thereby preventing the rapid yellowing and fading observed in prior art solutions under intense solar exposure, particularly in climates. It also contributes to enhanced thermal stability, ensuring film integrity under high temperatures.
Hybrid Curing Agent System
Hybrid Curing Agent System is pivotal to the invention's dual-cure mechanism, enabling robust and versatile crosslinking under varied field conditions. HDI Trimer/IPDI (Aliphatic Polyisocyanates) are curing agents, typically employed at a stoichiometric NCO: OH ratio ranging broadly from 0.95:1 to 1.1:1, form durable urethane linkages with the hydroxyl groups of the alkyd-polyester resin. The aliphatic nature of these isocyanates is important for conferring excellent UV stability and non-yellowing properties, maintaining the aesthetic and functional integrity of the markings over time. They also contribute to the overall flexibility, toughness, and adhesion of the paint film, enabling it to withstand dynamic stresses and thermal cycling without cracking or delamination, a common failure mode of brittle conventional paints.
Benzoyl Peroxide (BPO)
As a free radical initiator, BPO, typically used at 0.5 to 3.0% by weight of resin solids, preferably 1.0 to 2.0%, is essential for initiating the polymerization of the unsaturated functionalities, specifically the allyl groups present in the 3,3'-difluorodiallyl phthalate. This forms a distinct, highly crosslinked, and rigid network that contributes directly to the paint's hardness, abrasion resistance, and enhanced chemical resistance.

Co-Organic Promoter for Benzoyl Peroxide

To ensure efficient and controlled curing kinetics, especially in varying field temperatures (20-50° C.), a co-organic promoter, such as a tertiary amine (e.g., N,N-dimethylaniline, N,N-dimethyl-p-toluidine) or a metal carboxylate (e.g., cobalt octoate), is included at typically low concentrations (e.g., 0.05-2% by weight of the BPO). This promoter accelerates the decomposition of benzoyl peroxide, generating free radicals more rapidly, thereby optimizing the onset and rate of the radical polymerization. This ensures a consistent and reliable cure profile, achieving faster tack-free times and more complete through-cure even under suboptimal ambient conditions, which is important for minimizing field downtime.

Pigmentation

Rutile Titanium Dioxide, yellow iron oxide, red iron oxide, carbon black or black iron oxide are incorporated, typically ranging broadly from 20 to 50 parts by weight, preferably 25 to 40 pbw. It serves as the primary coloring pigment, providing opacity, brightness, and color stability to the markings. Its high refractive index ensures hiding power and visual contrast, which is important for ensuring clear and lasting markings that enhance playing safety. $TiO_2$ also contributes to UV screening, further protecting the binder from degradation.

Performance Additives

Additives are included in small, yet important, amounts to optimize the paint's processing, application, and long-term performance properties.

Leveling/Flow Agents

Added at 0.1-0.3 pbw, to ensure the wet paint film flows out smoothly after application, preventing surface irregularities such as brush marks, roller marks, or "orange peel" texture. This contributes to a uniform and aesthetically pleasing finish.

Anti-Settling Agents

Incorporated at 0.1-0.3 pbw, it prevents the sedimentation of pigments and fillers during storage, ensuring that the paint remains homogeneous and easily re-dispersible, thus maintaining consistent application properties and color over time.

Foam Control Agents/Defoamers

Included at 0.1-0.3 pbw, these agents prevent the formation and stabilization of air bubbles during mixing and application, leading to a defect-free film free from pinholes or craters.

UV Absorbers and Hindered Amine Light Stabilizers (HALS)

While the fluorinated polymer provides inherent UV resistance, additional UV additives (0.05-0.15 pbw) can be incorporated to further enhance long-term color stability and prevent photoyellowing, particularly for maintaining vibrancy in intense solar environments. Odor Masking Additives: Optionally, at 0.05-0.15 pbw, these can be included to minimize any residual solvent or resin odors, enhancing user comfort during and after application.

Solvent Blend System

Solvent Blend system acts as a volatile carrier, ensuring proper application viscosity and film formation. Ethyl Acetate/Xylene mix blend, typically ranging broadly from 10 to 30 pbw, preferably 15 to 25 pbw, provides an optimized evaporation profile. Ethyl acetate, a fast-evaporating ester solvent, ensures rapid initial tack-free times, minimizing dirt pick-up and field downtime. Xylene, a medium-to-slow evaporating aromatic solvent, ensures sufficient open time for proper flow and leveling, preventing application defects such as blushing or orange peel, especially important in hot climates. The ratio of ethyl acetate to xylene within the blend is typically adjusted to balance drying speed with flow properties (e.g., 30-70% Ethyl Acetate, 70-30% Xylene).

Example 2: Synthesis or Formulation

The sports field marking paint is prepared through a multi-stage process that ensures dispersion of components, complete reaction, and the formation of a stable, high-performance composition. This encompasses both the synthesis of the graphene oxide-modified fluorinated alkyd-polyester resin and the subsequent compounding of this resin into the final multi-component paint product.

Synthesis of Graphene Oxide-Modified Fluorinated Alkyd-Polyester Resin

The preparation of the resin system, which serves as the foundational binder for the paint, involves a carefully controlled polycondensation (esterification) process, followed by the strategic integration of both fluorinated monomers and graphene oxide nanosheets.

Initial Esterification (Alkyd-Polyester Backbone Formation)

In a suitably equipped reaction vessel (e.g., a stainless steel reactor fitted with heating capabilities, mechanical agitation, and a Dean-Stark trap for continuous removal of reaction by-products, typically water), the primary polyol component, pentaerythritol, alongside phthalic anhydride and 30-70% of the fatty acid components, are charged.

Definition of Fatty Acid Components: The fatty acid components in this invention refer to mono- or di-carboxylic acids derived from natural oils (e.g., soybean, linseed, tung) or synthetic sources, characterized by: (1) Chain Length: Typically, C12-C18 (e.g., linoleic, oleic, stearic acids), (2) Functionality: Contain reactive carboxyl (—COOH) groups for esterification with polyols, and (3) Unsaturation: Varying degrees of double bonds (e.g., linoleic acid: 2 double bonds; oleic acid: 1).

Examples Used in the Invention: (1) Soybean oil fatty acids (50-60% linoleic, 20-30% oleic)—Primary component for balanced flexibility/curing, (2) Linseed oil fatty acids (high linolenic content)—Faster oxidative cure, and (3) Tung oil fatty acids (eleostearic acid)—For extreme weather resistance.

Role of Fatty Acids in Esterification: Fatty acids are critical reactants in alkyd synthesis, serving three key purposes: (1) Backbone Formation: React with polyols (e.g., pentaerythritol) and acid/anhydride components (e.g., phthalic anhydride) via polycondensation to form the polyester backbone, (2) Property Modulation: flexibility: Long aliphatic chains of fatty acids impart elasticity to the cured film (critical for crack resistance on turf/asphalt), and curing Mechanism: Unsaturated fatty acids (e.g., linoleic) enable auto-oxidative crosslinking upon exposure to air, enhancing durability, and (3) Compatibility: Fatty acids improve resin solubility in solvents (e.g., xylene) and pigment wetting.

Integration into the Alkyd-Polyester Backbone: Fatty acids chemically incorporate into the polymer backbone during esterification: (1) Covalent Bonding: Fatty acid carboxyl groups form ester linkages with hydroxyl groups of polyols (e.g., pentaerythritol) and anhydrides (e.g., phthalic anhydride), (2) Structural Impact: Saturated fatty acids (e.g., stearic acid) increase hydrophobicity and chemical resistance, Unsaturated fatty acids (e.g., linoleic acid) introduce crosslinking sites for oxidative curing. FT-IR peaks at 1735 cm$^{-1}$ (ester C=O stretch) and 1160 cm$^{-1}$ (C—O—C) confirm incorporation The mixture is heated gradually under an inert atmosphere (e.g., nitrogen purge, maintained throughout the reaction) to initiate the esterification reaction. This stage typically proceeds at temperatures ranging from 180° C. to 240° C. Water generated from the condensation is continuously collected and removed.

Incorporation of Tetrafluorophthalic Anhydride

After approximately 1 hour of initial esterification, or upon reaching a predetermined acid value or viscosity, Tetrafluorophthalic Anhydride is introduced directly into the reacting mixture. This fluorinated diacid anhydride actively participates in the ongoing polyester polycondensation, forming stable ester linkages within the developing polymer backbone. Its inclusion at this stage ensures a uniform distribution of fluorine atoms throughout the polyester chains, thereby contributing to the inherent chemical, UV, and thermal resistance of the resultant resin.

Post-Esterification Integration of 3,3'-Difluorodiallyl Phthalate and Graphene Oxide Upon completion of the primary polyesterification reaction, indicated by achieving the desired acid value and molecular weight, the reaction mixture is cooled to approximately 50° C. At this reduced temperature, the 3,3'-Difluorodiallyl Phthalate is added to the mixture. This fluoro-allyl monomer's dual allyl functionalities are important for providing unsaturated sites for subsequent free radical crosslinking during the paint's curing process, thereby becoming an integral part of the final cured polymer network. Its fluorinated structure further enhances the chemical inertness of the resulting composite polymer.

Concurrently or immediately thereafter, the graphene oxide (GO) nanosheets are introduced into the cooled resin mixture under controlled agitation. While the high-temperature esterification has ceased, the hydroxyl and carboxyl groups inherently present on the GO surface can still react with any residual carboxyl or hydroxyl functionalities on the already formed alkyd-polyester resin backbone, or through specifically engineered surface modifications of the GO. This covalent bonding ensures that the GO nanosheets are not merely physical fillers but are chemically linked to the polymer structure.

This robust interfacial interaction is paramount for effectively transferring mechanical stress within the composite, leading to the significant enhancement in mechanical strength and abrasion resistance observed in the final paint film. Agitation speed is carefully controlled to ensure uniform dispersion and chemical reaction of GO without causing degradation or unwanted agglomeration.

Resin Completion and Quality Control

Following the integration of 3,3'-Difluorodiallyl Phthalate and Graphene Oxide, the resin mixture is held at the appropriate temperature (e.g., 50° C.) for a specified duration to ensure full incorporation and any ongoing lower-temperature reactions.

The resin is then cooled to an appropriate temperature and thinned with a predetermined portion of the ethyl acetate/xylene blend to achieve a workable viscosity suitable for subsequent paint compounding.

Quality Control Point

The synthesized resin is thoroughly analyzed for key parameters including acid value, hydroxyl value, non-volatile content, viscosity, and color. Furthermore, its graphene oxide content and fluorination level are verified to ensure consistency and adherence to specifications.

Example 3: General Process for Paint Formulation (Compounding)

The final paint product is typically supplied as a three-component (3K) system, designed to ensure maximum stability of each reactive component prior to application and precise control over the curing reaction. Component A (Part A) includes the resin, pigments, and certain additives. Component B (Part B) contains the hybrid curing agents (isocyanates and peroxide). Component C (Part C) contains the organic promoter for the peroxide.

Preparation of Component A (Base Paint)

Pigment Dispersion

In a suitable high-shear mixing vessel equipped with temperature control and robust agitation (e.g., a high-speed disperser), the Titanium Dioxide pigment is gradually added to a predetermined portion of the total solvent blend (e.g., 20-30% of the total solvent mix). Concurrently, the anti-settling agent and a portion of the foam control agent are introduced.

The mixture is subjected to high-speed dispersion (typically 1000-2500 rpm, depending on batch size and equipment configuration) until the pigment agglomerates are thoroughly wetted and dispersed. This process aims to achieve a Hegman grind fineness of typically 6-7, indicating an optimal level of dispersion. The temperature of the dispersion is carefully monitored and maintained below 40° C. to prevent excessive heat buildup.

Resin Incorporation and Additive Blending

Once optimal pigment dispersion is confirmed, the pre-synthesized graphene oxide-modified fluorinated alkyd-polyester resin is slowly and uniformly added to the agitated pigment paste then the calculated amount of polyester is added. Agitation speed is adjusted to ensure thorough incorporation and complete wetting of the pigment by the resin, preventing any re-agglomeration.

Subsequently, the remaining performance additives, including leveling agents, UV absorbers, and any optional odor masking additives, are systematically incorporated into the mixture under moderate agitation (e.g., 500-1000 rpm). Sufficient mixing time is provided for each additive to ensure homogeneous distribution throughout the paint base.

Viscosity Adjustment and Homogenization

The remaining portion of the solvent blend (ethyl acetate/xylene mix) is gradually added while continuously monitoring the paint's viscosity. Solvent addition continues until the target application viscosity is achieved, typically ranging from 70-90 KU (Krebs Units) as measured by an ASTM D562 viscometer. The entire mixture is then subjected to a final period of moderate agitation to ensure complete homogenization.

Quality Control Point

At this stage, the Component A paint base is rigorously sampled for initial quality control checks, including viscosity, pH, Hegman grind fineness, and color.

Preparation of Component B (Curing Agent Blend-Isocyanate/Peroxide)

Isocyanate and Peroxide Integration

A separate, moisture-free mixing vessel, the HDI trimer/IPDI blend is precisely measured. The benzoyl peroxide (typically supplied as a paste for safety and ease of handling) is then carefully added to the isocyanate mixture under low-speed agitation to prevent air incorporation. Agitation continues until all components are homogeneously mixed. Care is taken to avoid excessive heat generation during this step, which could prematurely activate the peroxide.

Quality Control Point

Component B is sampled for non-volatile content and NCO percentage.

Preparation of Component C (Organic Promoter)

Promoter Isolation

The co-organic promoter for benzoyl peroxide (e.g., a tertiary amine or cobalt octoate solution) is kept isolated in a third, separate container (Component C). This separation ensures the long-term stability of both the peroxide and the promoter, preventing premature reaction during storage.

Example 4: Packaging and Storage

Component A, Component B, and Component C are packaged separately in sealed, airtight, and chemically resistant containers. This segregation prevents premature chemical reactions, minimizes solvent evaporation, and prevents moisture ingress, which could compromise the integrity of the reactive components. Optimal storage conditions (e.g., cool, dry place, out of direct sunlight, consistent temperature) are stringently recommended to maintain extended shelf life and product integrity.

Operational Cycle (Application Preparation)

The application of the sports field marking paint adheres to a well-defined operational cycle designed to ensure optimal performance, durability, and safety across a range of athletic surfaces and environmental conditions. This cycle accounts for the three-component nature of the system, the specific curing requirements, and the diverse substrates encountered in sports venues.

Surface Preparation

Prior to application, the target sports field surface must be adequately prepared to ensure optimal adhesion and longevity of the markings. For natural grass, this typically involves mowing to the desired height and allowing the grass to dry sufficiently. For artificial turf, concrete, or asphalt, the surface should be clean, dry, and free from loose debris, oil, grease, or other contaminants. Any existing peeling or severely degraded paint should be removed. While the paint exhibits superior adhesion, a clean and sound substrate remains paramount for achieving maximum performance.

Mixing of Components (Activation of Dual-Cure System)

The paint is supplied as a three-component system (Component A, Component B, and Component C) to maintain the stability of its reactive elements Proportioning Immediately prior to application, the precise, predetermined volumetric or gravimetric ratios of Component A (the base resin alkyd-polyester 30-10, 40%, pigment 33%, additives 2.3% and ethyl acetate/xylene 60-40, 19.7%), Component B (the HDI trimer/IPDI 3% and benzoyl peroxide 2% blend), and Component C (the organic promoter 2%) are accurately measured into a clean mixing container. These ratios are important and are specified by the manufacturer to ensure the correct stoichiometry for both the urethane reaction and the free radical polymerization.

Blending

The three components are then thoroughly blended using a mechanical stirrer. The mixing process should be conducted at a low to moderate speed (300 rpm) for a specified duration (typically 2 minutes) to achieve complete homogeneity. Care must be taken to minimize air entrapment during mixing, as excessive air can lead to film defects. This mixing step initiates the dual-cure mechanism, activating the isocyanate-hydroxyl reaction and preparing the peroxide for free radical generation.

Pot Life Observance

Upon mixing, the paint begins its curing process, and its viscosity will gradually increase. The mixed paint has a finite "pot life," which is the period during which it remains workable and can be effectively applied while maintaining its optimal properties. For this system, the pot life typically 12 minutes at ambient temperature 22° C. and humidity 70%. Application within this window is essential to ensure proper flow, leveling, and the development of the final film properties. Paint mixed beyond its pot life should not be used.

Application Methods

The uniformly mixed paint is then transferred to appropriate application equipment. The paint's rheological properties are optimized for versatile application across various methods, including airless Spraying: This method is preferred for achieving uniform film thickness and high application speed, particularly for large areas or continuous lines. The paint's viscosity and thixotropy are formulated to prevent sagging or running during spraying.

Example 5: Curing and Property Development

Once applied to the prepared surface, the paint undergoes its sequential dual-cure process.

Initial Cure

The paint typically achieves a tack-free state rapidly, often within 30 minutes, depending on the ambient temperature (which can range broadly from 20° C. to 24° C.). This rapid surface cure minimizes dirt pick-up and allows for quick re-opening of the marked area for light foot traffic.

Through-Cure and Property Development

The full through-cure and complete development of the paint's superior mechanical, chemical, and UV resistance properties typically occur over a period of 30 hours, at film thickness 220 μm. The robust crosslinking, facilitated by the dual-cure system, ensures that the film can withstand thermal cycling without cracking and achieves its full potential for abrasion resistance and chemical inertness. The presence of the organic promoter ensures efficient activation of the benzoyl peroxide component across the specified temperature range, important for consistent performance in varying climates.

Through this complete operational cycle, the paint ensures clear, lasting markings that improve playing safety and reduce the substantial maintenance needs associated with conventional sports field marking solutions.

Example 6: Identification of Important Components or Steps

The robust and superior performance of the present invention is contingent upon the precise integration and synergistic interaction of several important components and procedural steps. These elements are non-obvious and indispensable, collectively distinguishing the composition from prior art and ensuring its claimed utility.

Foremost among these important components are the fluorinated monomers, specifically the incorporation of tetrafluorophthalic anhydride and 3,3'-difluorodiallyl phthalate. The precise timing and method of their introduction into the alkyd-polyester resin synthesis are paramount. Tetrafluorophthalic anhydride's direct participation in the polyester backbone formation is important for establishing intrinsic chemical, UV, and thermal resistance across the entire polymer chain. Simultaneously, the strategic post-esterification inclusion of 3,3'-difluorodiallyl phthalate is essential, as its allyl functionalities provide the necessary unsaturated sites for the subsequent free radical crosslinking, which dramatically enhances the cured film's hardness, chemical inertness, and overall durability. The fluorine atoms within both these monomers are indispensable for imparting the environmental resilience needed for high-traffic sports field markings, a property largely absent in conventional alkyd-polyester systems.

Equally important is the controlled incorporation and covalent bonding of graphene oxide nanosheets within the resin matrix. This is not merely a physical dispersion of a filler; rather, the deliberate design of the resin synthesis to enable chemical linkage between the graphene oxide and the polymer backbone is fundamental. This covalent integration ensures maximum stress transfer, leading to the unprecedented enhancement in abrasion resistance and mechanical strength, directly addressing the severe wear challenges posed by athletic foot traffic. Without this chemical tethering, the reinforcing effect of graphene oxide would be diminished.

Furthermore, the synergistic action of the sequential dual-cure system constitutes a pivotal important aspect. This system, including both the isocyanate-hydroxyl reaction (from the HDI trimer/IPDI) and the peroxide-initiated polymerization of the unsaturated fluorinated components (from the benzoyl peroxide and its co-organic promoter), is indispensable. The precise balance between these two curing mechanisms allows for a robust, multi-stage network formation. The isocyanate-driven cure provides flexibility and toughness, while the peroxide-initiated cure contributes high crosslink density and chemical resistance from the fluorinated allyl groups. This dual mechanism ensures comprehensive property development, enabling the paint to cure effectively across a broad temperature range (20-70° C., important for diverse application conditions including Egypt's climate) while simultaneously preventing common film defects, such as cracking during thermal cycling, which is a frequent failure mode in single-cure or less robust systems.

Finally, the precise compositional ratios of all key components, including the graphene oxide-modified fluorinated resin, the hybrid curing agents, the titanium dioxide, and the specific solvent blend, are important. Any deviation from the disclosed broad and preferred ranges can compromise the delicate balance needed for optimal processability, film formation, curing kinetics, and ultimate performance characteristics. These precise ratios are the culmination of extensive experimentation and are essential to achieving the claimed properties of immovability, enhanced durability, and excellent versatility.

The paint of the present disclosure includes a graphene oxide-modified fluorinated alkyd-polyester resin system, wherein proportions of tetrafluorophthalic anhydride are integrated into the polymer backbone, imparting chemical, UV, and thermal resistance not found in conventional alkyds or polyesters. This directly addresses the severe degradation of traditional paints under environmental stresses, a persistent problem for sports field markings.

The strategic post-esterification incorporation of 3,3'-difluorodiallyl phthalate, which, while contributing additional fluorine, provides unsaturated sites that become integral to the final polymer network through a subsequent radical crosslinking mechanism. This specialized inclusion provides superior inertness and contributes to the overall robustness. The establishment of robust covalent bonding between graphene oxide nanosheets and the resin matrix, a feature that delivers unprecedented enhancements in mechanical strength, particularly in foot traffic abrasion resistance, an unmet need for high-wear sports applications. This covalent integration transcends the limited reinforcement offered by mere physical dispersion of fillers in prior art compositions. A sophisticated three-component sequential dual-cure system, including an HDI trimer/IPDI blend, benzoyl peroxide, and a distinct organic promoter. This system enables versatile and reliable curing across a broad range of temperatures (20-70° C.), while simultaneously preventing common cracking issues during thermal cycling, a significant improvement over the restricted application and curing profiles of single-cure or less optimized two-component systems.

Example 7: Physical Characteristics and Test Data Evidencing Utility

The paint was evaluated in accordance with recognized international standards, and demonstrated long-lasting, robust, and functional markings even under environmental and mechanical stresses.

Chemical Resistance (ASTM D1308): The cured paint film exhibits directly to fuel/oil. It shows fuel/oil resistance chemical exposures, an improvement over traditional formulations. Specifically, when subjected to immersion in gasoline, the composition demonstrated a mass change of less than 0.5%. This minimal alteration underscores its remarkable inertness to aggressive solvents and chemicals commonly encountered on sports fields, such as fuels, cleaning agents, and fertilizers, outperforming conventional alkyd paints which typically exhibit mass changes exceeding 5% under similar conditions.

UV Resistance and Color Stability (Accelerated Weathering): The paint maintains aesthetic and functional integrity under prolonged solar exposure. After 5,000 hours of accelerated weathering (QUV testing), the paint exhibited a color change ($\Delta E$) of less than 1.0. This indicates a virtually imperceptible change in color, directly demonstrating its superior resistance to UV degradation, chalking, and yellowing, a common failure mode for prior art alkyd-based paints, particularly important in high-UV regions.

Heat Stability (Thermogravimetric Analysis-TGA): The robust fluorinated polymer network within the composition confers excellent thermal stability. Thermogravimetric analysis (TGA) confirmed that the cured film remains stable up to 80° C. without significant degradation or softening. This intrinsic heat resistance prevents adverse effects such as film softening or embrittlement when exposed to the extreme surface temperatures prevalent on sports fields, particularly during hot summer months.

Abrasion Resistance (ASTM D4060-Taber Abrasion Test): Directly addressing the primary challenge of foot traffic wear, the paint demonstrated a 50% improvement in wear resistance when subjected to the Taber Abrasion Test (ASTM D4060) compared to leading conventional sports field paints. This substantial enhancement in abrasion resistance directly correlates to extended durability against the intense and repetitive scuffing and impact forces from athletic footwear.

Mechanical Strength (ASTM D638-Tensile Strength): The integration of covalently bonded graphene oxide nanosheets fundamentally alters the mechanical properties of the cured film. The composition exhibited a 200% increase in tensile strength (ASTM D638) compared to unreinforced alkyd-polyester counterparts. This enhanced mechanical strength contributes directly to the film's integrity, resistance to micro-cracking, and overall toughness, thus prolonging its functional lifespan.

Foot Traffic Performance (EN 14836 Cycling Test): To simulate real-world field conditions, the paint's performance under continuous foot traffic was evaluated using the EN 14836 cycling test. The paint successfully endured over 50,000 foot-traffic cycles with less than 5% wear. This data unequivocally demonstrates the unprecedented longevity and durability of the markings under intense athletic use, far exceeding the performance capabilities of conventional paints and reducing the frequency of re-marking.

Adhesion (ASTM D3359-Peel Strength): The unique formulation ensures superior adhesion across the diverse range of substrates encountered in sports fields. The paint maintained a peel strength exceeding 4 N/mm when tested on varied surfaces including natural turf, artificial turf, concrete, and asphalt. This robust, consistent adhesion prevents delamination and ensures that the markings remain securely affixed regardless of the underlying playing surface.

Curing Range and Versatility: The sequential dual-cure system employed in this invention enables effective film formation across a broad spectrum of environmental conditions. An effective cure was observed between 20° C. and 70° C., confirming its suitability for wide-ranging field application scenarios, from moderate to extremely hot climates, ensuring reliable performance without temperature limitations.

VOC Content: (If applicable, state specific VOC level and compliance with relevant regulations, e.g., "The inventive composition is formulated to comply with stringent environmental regulations, exhibiting a low volatile organic compound (VOC) content of less than [100 g/L], contributing to improved air quality during and after application.")

The comprehensive test data presented herein unequivocally demonstrates the transformative utility of the paint composition. Its unique combination of fluorinated polymer network, graphene oxide nano-reinforcement, and a robust dual-cure system results in a product with unparalleled resistance to environmental degradation and mechanical wear, thereby offering a sustainable, cost-effective, and superior solution for high-traffic sports field markings.

TABLE 1

| Composition of alkyd-polyester paint | |
|---|---|
| Ingredient | Typical Content (parts by weight, pbw) |
| Graphene Oxide-Modified Fluorinated Alkyd-Polyester Resin (Containing ~1.5% w/w GO, ~15% w/w 3,3'-Difluorodiallyl Phthalate, ~15% w/w Tetrafluorophthalic Anhydride) | 48 |
| Titanium Dioxide (Rutile) | 35 |
| Ethyl Acetate | 10 |
| Xylene | 12 |
| Anti-settling Agent | 0.15 |
| Leveling Agent | 0.1 |
| Foam Control Agent | 0.05 |
| UV Absorber/HALS Blend | 0.1 |
| Total Component A | 105.4 |
| DI Trimer/IPDI | 4.5 |
| Benzoyl Peroxide (50% paste) | 1.5 |
| Total Component B | 6.0 |
| Tertiary Amine Promoter | 0.08 |
| Total Component C | 0.08 |

The previous coating formulation demonstrates a significant advantage over conventional road marking paints, such as conventional 3M traffic paint formulations, when exposed to the unique and challenging conditions found in sports fields. While road paints are optimized for vehicular traffic, they inherently lack the specialized properties needed to withstand the multiple stresses found in sports environments.

Direct comparison highlights the superior performance of the coating of the present disclosure in key areas important to sports field applications:

Foot Traffic and Abrasion Resistance

The coating: Specifically designed to resist foot traffic, it demonstrates durability against the abrasive impacts and shear forces of athletic footwear (such as spiked shoes). Laboratory tests (such as the EN 14836 cycling test) indicate this coating can withstand more than 50,000 foot traffic cycles with less than 5% wear, reducing wear and preserving the integrity of the markings. However, when compared to conventional paints, they are reduced by half, offering a durability of no more than 20,000 foot traffic cycles with 5% wear. This is because the covalently bonded graphene oxide provides superior mechanical reinforcement, allowing for a significant 50% improvement in Taber abrasion resistance compared to conventional formulations.

UV Stability and Color Retention

The coating features a fluorinated polymer network, ensuring UV resistance and color stability. Accelerated weathering tests (5,000 hours QUV) show a color change ($\Delta E$) of less than 1.0, indicating minimal yellowing or fading even in high solar radiation environments. This maintains the visual clarity and aesthetic appeal of the signs for long periods. When traditional road marking paints compared to the invention: Although some may have moderate resistance to road UV radiation, they often exhibit significant yellowing, discoloration, and color fading when exposed to intense UV radiation for extended periods. Under the same exposure conditions, they exhibit a color change ($\Delta E$) of 2.0.

Chemical Resistance

Coating: Resistant to severe chemical degradation due to its fluorinated components. It exhibits a mass change of less than 0.5% in strong solvents such as benzene, indicating strong inertness. This protects the markings from common chemicals found in sports fields, such as fertilizers, herbicides, cleaning agents, and accidental spills, which can compromise the integrity of less durable paints. Traditional road marking paints: They may have some resistance to road chemicals, but generally exhibit limited resistance and an average mass change of 11% under the same conditions. They are more susceptible to softening, discoloration, or damage when exposed to these substances.

Adhesion and Versatility on Various Surfaces

Coatings: Offer excellent versatility and strong adhesion (e.g., peel resistance >4 N/mm) on a wide range of sports surface types, including natural grass, various types of artificial turf, concrete, and asphalt. This eliminates the need for multiple specialized paints, simplifying inventory and application.

Traditional road marking paints: Typically formulated for asphalt or concrete roads, the control sample exhibits peel resistance in the Newton range 2-3 N/mm, leading to peeling and premature deterioration with misuse.

Example Formulation Demonstrating Adhesion and Durability

To further illustrate the practical embodiment of the composition and its demonstrated efficacy across diverse sports field surfaces, a specific, non-limiting example formulation is provided below. This composition exemplifies the precise balance of components necessary to achieve superior adhesion and durability on natural turf, concrete, asphalt, and synthetic courts, thereby overcoming the limitations of prior art. All values are presented in parts by weight (pbw), normalized to a total of 100 parts for the base paint formulation (Component A), with Component B and Component C added separately based on their stoichiometric and catalytic needs.

TABLE 2

| Composition of alkyd-polyester paint and function of components | | | |
|---|---|---|---|
| Component Category | Specific Component | Parts by Weight (pbw) | Function/Contribution to Adhesion & Durability |
| A. Graphene Oxide-Modified Resin System (Total: 45.00 pbw) | Graphene Oxide-Modified Alkyd-Polyester Resin (solids) | 40 | Primary film former; provides adhesion, flexibility, and acts as backbone. GO and fluorinated monomers are integrated. |
| | Graphene Oxide (GO) Content | (0.60)* | Nano-reinforcement; enhances mechanical strength, abrasion resistance, and durability against foot traffic. (*Calculated as % of resin solids, i.e., 1.5% of 40 pbw resin solids) |
| | 3,3'-Difluorodiallyl Phthalate | (5.20)* | Provides allyl groups for radical crosslinking during dual-cure; contributes to final film hardness and chemical inertness. (*Calculated as % of resin solids, i.e., 13% of 40 pbw resin solids and added in the resin synthesis) |
| | Tetrafluorophthalic Anhydride | (5.20)* | Integrated into polyester backbone; enhances chemical resistance, UV stability, and thermal stability. (*Calculated as % of resin solids, i.e., 13% of 40 pbw resin solids and added in the resin synthesis) |
| B. Pigmentation | Titanium Dioxide (Rutile Grade) | 30 | Provides opacity, brightness, UV screening, and long-term color stability. Essential for visibility and protection. |
| C. Performance Additives | Anti-Settling Agent | 0.2 | Prevents pigment sedimentation; maintains homogeneity for consistent application. |
| | Leveling Agent | 0.15 | Ensures smooth, uniform film formation, important for optical clarity and appearance on various surfaces. |
| | Foam Control Agent | 0.1 | Eliminates air bubbles during mixing/application, ensuring a defect-free, continuous film for optimal barrier properties and durability. |
| | UV Absorber/ HALS | 0.1 | Further enhances long-term color retention and film integrity under prolonged solar exposure. |
| D. Solvent Blend (Total: 24.45 pbw) | Ethyl Acetate | 12.23 | Fast evaporation rate; contributes to rapid tack-free time, minimizing dirt pick-up and allowing quicker use of the marked area. |
| | Xylene | 12.22 | Medium-to-slow evaporation rate; provides sufficient open time for leveling and ensures proper film formation without defects, important for diverse application conditions and substrates. |
| Total Component A (Base Paint) | | 100.00 pbw | |
| Separate Components (Added at Time of Application) | HDI Trimer/IPDI Blend (Component B) | Ratio to Component A: 2.0 pbw per 100 pbw Component A | Forms robust urethane crosslinks with resin hydroxyls; enhances flexibility, toughness, non-yellowing UV stability, and strong adhesion to various surfaces. |
| | Benzoyl Peroxide (Component B, 50% paste) | Ratio to Component A: 0.8 pbw per 100 pbw Component A | Initiates free radical polymerization of allyl groups (from 3,3'-difluorodiallyl phthalate); contributes to high crosslink density, hardness, and chemical resistance. |
| | Co-Organic Promoter (Component C) | Ratio to Component B: 0.1 pbw per 100 pbw Component B paste | Accelerates BPO decomposition; ensures efficient and controlled curing kinetics, allowing reliable performance across a broad range of application temperatures. |

This specific formulation of balanced polymeric network, reinforced by covalently bonded graphene oxide and protected by fluorinated segments, ensures robust adhesion to both porous (turf, concrete) and non-porous (asphalt, synthetic court) substrates. The dual-cure mechanism provides rapid hardness development for immediate foot traffic resistance while ensuring a thorough, durable cure that withstands the combined stresses of mechanical abrasion, chemical exposure, and environmental weathering.

In this present disclosure, the durable alkyd-polyester paint composition for sports field markings presents an advancement over conventional paint systems, offering increased performance, economic efficiency, and environmental sustainability is described. Reinforced with graphene oxide, the paint exhibits durability and resistance to wear, foot traffic, abrasion, and impact, ensuring long-lasting and immovable field markings. Its superior chemical and weather resistance protects against UV radiation, thermal cycling, and exposure to harsh cleaning agents and fertilizers, preventing fading, peeling, and degradation even in extreme climates. The paint adheres strongly to various substrates including natural and synthetic turf, concrete, and asphalt, simplifying application across different sports surfaces.

A dual-cure system enables rapid drying between 20° C. and 70° C., allowing for quick return to service and minimizing field downtime. This results in faster resumption of games and events. Additionally, the composition reduces maintenance costs by extending the life of field markings, decreasing the need for frequent recoating, and minimizing disruptions due to repairs. Safety and aesthetics are enhanced through vibrant, high-visibility colors that improve boundary clarity and field appearance, promoting both player safety and a professional visual appeal.

Environmentally, the formulation is eco-friendly with low VOC emissions, contributing to sustainability by reducing air pollution and limiting waste through less frequent repainting. Overall, this paint system ensures consistent, reliable, and visually appealing playing surfaces while enhancing operational efficiency and reducing long-term maintenance efforts.

Numerous modifications and variations of the present disclosure are possible in light of the above teachings. It is therefore to be understood that within the scope of the appended claims, the invention may be practiced otherwise than as specifically described herein.

The invention claimed is:

1. An alkyd-polyester paint, comprising:
a graphene oxide (GO)-modified resin, benzoyl peroxide, a diisocyanate, a pigment, a solvent, and one or more selected from the group consisting of a tertiary amine and a metal carboxylate,
the GO-modified resin comprising graphene oxide, 3,3'-difluorodiallyl phthalate and tetrafluorophthalic anhydride.

2. The alkyd-polyester paint of claim 1, wherein the GO is 0.1-5 wt % of the weight of the resin solids.

3. The alkyd-polyester paint of claim 1, wherein the 3,3'difluorodiallyl phthalate is 3-10 wt % of the total weight of the alkyd-polyester paint.

4. The alkyd-polyester paint of claim 1, wherein the tetrafluorophthalic anhydride is 3-10 wt % of the total weight of the alkyd-polyester paint.

5. The alkyd-polyester paint of claim 1, wherein the diisocyanate is one or more selected from the group consisting of hexamethylene diisocyanate (HDI), isophorone diisocyanate (IPDI), and a HDI trimer/IPDI.

6. The alkyd-polyester paint of claim 1, wherein the tertiary amine is one or more selected from the group consisting of N,N-dimethylaniline and N,N-dimethyl-p-toluidine.

7. The alkyd-polyester paint of claim 1, wherein the metal carboxylate is cobalt octoate.

8. The alkyd-polyester paint of claim 1, wherein the pigment is at least one selected from the group consisting of titanium dioxide, yellow iron oxide, red iron oxide, carbon black and black iron oxide.

9. The alkyd-polyester paint of claim 1, wherein the pigment is 25-40 wt % of the total weight of the alkyd-polyester paint.

10. The alkyd-polyester paint of claim 1, further comprising one or more selected from the group consisting of a flow agent, an anti-settling agent, a foam control agent, a UV-absorber, and an odor masking additive.

11. The alkyd-polyester paint of claim 1, wherein the solvent is one or more selected from the group consisting of ethyl acetate and xylene.

12. The alkyd-polyester paint of claim 1, wherein the solvent is a mixture of ethyl acetate and xylene.

13. The alkyd-polyester paint of claim 1, wherein ethyl acetate is 30-70% of the total volume of the solvent and xylene is 30-70% of the total volume of the solvent.

14. The alkyd-polyester paint of claim 1, wherein the solvent is 20-30 wt % of the total weight of the paint.

15. A method of making the alkyd-polyester paint of claim 1, comprising:
mixing a polyol component, pentaerythritol, phthalic anhydride, and tetrafluorophthalic anhydride to form a polymer backbone;
mixing 3,3'-difluorodiallyl phthalate and graphene oxide with the polymer backbone to form the GO-modified resin;
thinning the GO-modified resin with a solvent to form a solution;
adding the curing agent, the co-promoter of the curing agent, the pigment, and the performance additive to the solution to form the alkyd-polyester paint.

16. The method of claim 15, wherein the mixing to form the polymer backbone is at 150-300° C.

17. The method of claim 15, wherein the adding to form a GO-modified resin is at 25-100° C.

18. The alkyd-polyester paint of claim 1, having a color change ($\Delta E$) of 0-2.0 after 5,000 hours of UV irradiation.

19. The alkyd-polyester paint of claim 1, having 0-10% thermal degradation up to 80° C.

20. The alkyd-polyester paint of claim 1, having volatile organic compound content of less than 100 g L$^{-1}$.

* * * * *